United States Patent [19]

Mühlberger et al.

[11] 4,013,425

[45] Mar. 22, 1977

[54] THERMOMETRIC BIMETALLIC STRUCTURE OF HIGH STRENGTH AT HIGH TEMPERATURE

[75] Inventors: Horst Mühlberger, Frankfurt am Main; Manfred Rühle, Offenbach, both of Germany

[73] Assignee: Metallgesellschaft Aktiengesellschaft, Frankfurt am Main, Germany

[22] Filed: June 22, 1976

[21] Appl. No.: 698,494

[30] Foreign Application Priority Data

June 26, 1975 Germany .......................... 2528457

[52] U.S. Cl. ............................ 29/195.5; 75/123 B; 75/123 N; 75/123 J; 75/123 K; 75/128 A; 75/128 N; 75/128 G; 75/128 V; 75/128 W

[51] Int. Cl.[2] .................. B32B 15/18; C22C 38/04; C22C 38/12; C22C 38/46

[58] Field of Search ....................... 29/195.5, 196.1; 75/123 BN, 123 J, 123 K, 128 A, 128 N, 128 G, 128 V, 128 W

[56] References Cited

UNITED STATES PATENTS

| | | | |
|---|---|---|---|
| 2,700,627 | 1/1955 | Nelson | 29/195.5 |
| 3,318,690 | 5/1967 | Floreen et al. | 75/128 G |
| 3,336,119 | 8/1967 | Alban et al. | 29/195.5 |

*Primary Examiner*—Arthur J. Steiner
*Attorney, Agent, or Firm*—Karl F. Ross; Herbert Dubno

[57] ABSTRACT

A thermometric bimetallic structure of high strength at elevated temperatures of, say, 500° C to 700° C, comprises an active component and a passive component secured together, the active component having a coefficient of thermal expansion of about $19 \times 10^{-6}\,°C^{-1}$ to $22 \times 10^{-6}\,°C^{-1}$ while the passive component has a coefficient of expansion of $3 \times 10^{-6}\,°C^{-1}$ to $12 \times 10^{-6}\,°C^{-1}$. The active component, which expands to a substantially greater extent than the passive component upon heating, consists of 0.4 to 0.9% by weight carbon, 0.03 to 0.1% by weight nitrogen, 10 to 14% by weight nickel, 3 to 7% by weight manganese, 0.2 to 1% by weight niobium and/or tantalum, 0.5 to 1.5% by weight vanadium, up to 1.5% by weight molybdenum, up to 1.5% by weight tungsten, up to 3.5% by weight chromium, up to 0.5% by weight silicon and the balance iron and unavoidable impurities resulting from the melting of the ingredients to form the alloy. The laminate of the two components can be cold worked to improve its hardness.

14 Claims, 1 Drawing Figure

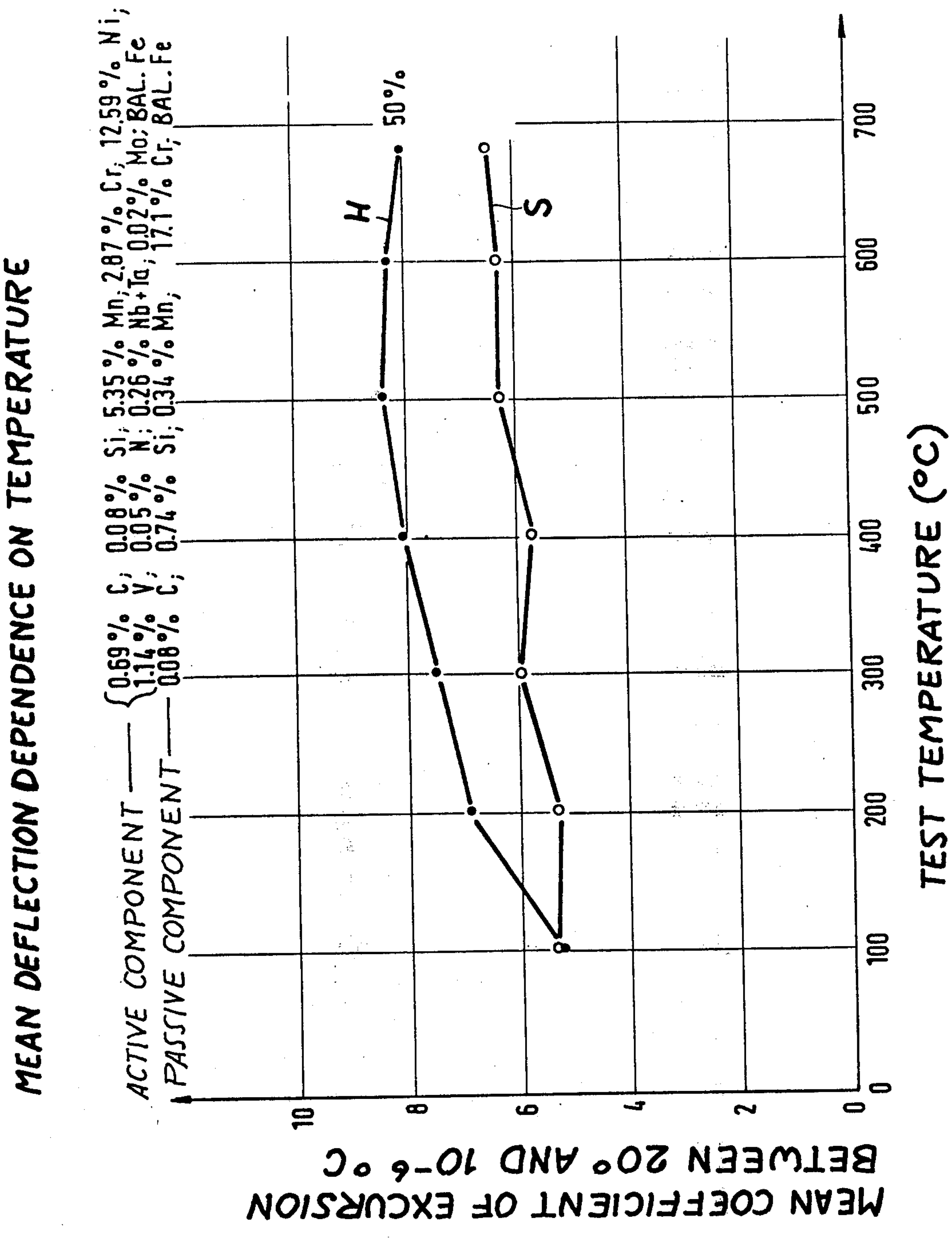
MEAN DEFLECTION DEPENDENCE ON TEMPERATURE
ACTIVE COMPONENT — 0.69% C; 0.08% Si; 5.35% Mn; 2.87% Cr; 12.59% Ni;
1.14% V; 0.05% N; 0.26% Nb+Ta; 0.02% Mo; BAL. Fe
PASSIVE COMPONENT — 0.08% C; 0.74% Si; 0.34% Mn; 17.1% Cr; BAL. Fe
50%
H
S
0
100
200
300
400
500
600
700
TEST TEMPERATURE (°C)
0
2
4
6
8
10
MEAN COEFFICIENT OF EXCURSION
BETWEEN 20° AND 10-6 °C

THERMOMETRIC BIMETALLIC STRUCTURE OF HIGH STRENGTH AT HIGH TEMPERATURE

FIELD OF THE INVENTION

This invention relates to a thermometric bimetallic structure of high strength at high temperature.

BACKGROUND OF THE INVENTION

A thermometric bimetallic structure consists generally of two joined plates or strips of metals having different coefficients of expansion so that a temperature rise causes the bimetallic structure to change its shape in dependence on temperature.

This property is utilized in engineering in many cases for automatic control by temperature of other physical quantities which are related to temperature, such as the electric current, e.g., in electric motors, in order to prevent an overloading thereof.

The coefficient of excursion (deflection) of a thermometric bimetal from an original position depends essentially on the physical properties of the joined metals and on the dimensions of the temperature-sensing and switching elements made therefrom. For this reason the accuracy of the operation of such switching elements depends on the quality of the component metals and on the precision with which they have been joined.

In general, the highest coefficients of excursion, e.g. of an automatic control element, will be obtained if the so-called active component has a high thermal coefficient of expansion and the passive component has a low thermal coefficient of expansion. The excursion as such is known to depend on the temperature responses of the coefficients of expansion of the two components of the bimetal.

The dependence of the mechanical strength of the components on temperature is also important because this dependence often determines the upper limit of the temperature range in which the bimetallic structure may be used.

The previously known thermometric bimetallic structure includes combinations that have been developed for use up to a very high upper temperature limit. The bimetallic structures which are presently available on the market can only be used up to an upper temperature limit of about 500° C, because above this temperature the coefficients of expansion of the iron-nickel alloys used as passive components increase so sharply that the laminated bimetallic structure no longer responds to a further temperature rise. Additionally one component or both components can soften at temperatures above 500° C so that the temperature rise results in a permanent deformation of the bimetallic structure and the latter does not return to its original shape when cooled.

Owing to the low strength of the component or both components at elevated temperatures, the bimetallic structure can exert only small actuating or control forces and for this reason cannot perform the desired switching operation in many cases.

On the other hand, there is a general desire to provide automatic and other control systems for use at higher temperatures above 500° C.

It has been found that the thermometric bimetallic structures which have been available to data do not meet the requirements or do not sufficiently meet the requirements. This remark is applicable, e.g., to widely used domestic appliances, such as toasters, or to motor vehicle exhaust systems providing for a decontamination of exhaust gases.

Object of the Invention

It is an object of the invention to provide a thermometric bimetallic structure, or a shaped thermometric bimetal part, which can be used at temperatures above 500° C, which does not have plastic deformation at high temperatures, and which gives a sufficiently large deformation in response to changes of temperature.

Summary of the Invention

A shaped part consisting of thermometric bimetal and having a high strength at high temperature and comprising an active component and a passive component and, if desired, an electrically conductive interlayer for direct heating, in accordance with the invention, has an active component which consists of an iron-nickel alloy having a coefficient of expansion of about $19 \times 10^{-6}\,°\,C^{-1}$ to $22 \times 10^{-6} \times °\,C^{-1}$ and composed by weight of:

| | |
|---|---|
| 0.4% to 0.9% | carbon, |
| 0.03% to 0.10% | nitrogen, |
| 10.0% to 14.0% | nickel, |
| 3.0% to 7.0% | manganese, |
| 0.2% to 1.0% | niobium and/or tantalum |
| 0.5% to 1.5% | vanadium, |
| up to 1.5% | molybdenum, |
| up to 1.5% | tungsten (the total of V+Mo+W not exceeding 2%), |
| up to 3.5% | chromium, |
| up to 0.5% | silicon, and the |
| balance | iron with impurities which are due to the melting conditions. |

The passive component is metallic and has a coefficient of expansion of about $3 \times 10^{-6}\,°\,C^{-1}$ to $12 \times 10^{-6} \times °\,C^{-1}$ combined with a sufficient strength at high temperature.

An alloy which is particularly suitable for the active component of the thermometric bimetal according to the invention is composed by weight of

| | |
|---|---|
| 0.60% to 0.75% | carbon, |
| 0.05% to 0.08% | nitrogen, |
| 11.5% to 12.5% | nickel, |
| 4.5% to 5.5% | manganese, |
| 0.2% to 0.5% | niobium and/or tantalum, |
| 0.9% to 1.2% | vanadium, |
| 2.5% to 3.5% | chromium, |
| less than 0.3% | silicon, |
| less than 0.02% | phosphorus, |
| less than 0.02% | sulfur, and |
| balance | iron. |

This alloy has a coefficient of expansion of about $20.2 \times 10^{-6}\,°\,C^{-1}$ to $20.7 \times 10^{-6} \times °\,C^{-1}$.

The passive component of the thermometric bimetal according to the invention must have a coefficient of expansion of about $3 \times 10^{-6}\,°\,C^{-1}$ to $12 \times 10^{-6} \times °\,C^{-1}$ and may consist of metals or metal alloys having different compositions. The iron-nickel alloys can have the composition by weight of:

| | |
|---|---|
| less than 0.03% | carbon, |
| less than 0.5% | manganese, |
| less than 0.2% | silicon, |
| 16% to 20% | cobalt |
| 27% to 31% | nickel, and |

-continued

| | |
|---|---|
| balance | iron with impurities which are due to the melting conditions. |

An alloy which is particularly suitable is composed by weight of:

| | |
|---|---|
| less than 0.5% | manganese, |
| less than 0.03% | carbon, |
| less than 0.2% | silicon, |
| about 18.0% | cobalt, |
| about 29.0% | nickel, |
| optionally 0.1% to 0.5% molybdenum, and | |
| balance | iron with impurities which are due to the melting conditions. |

These alloys have a coefficient of expansion of $5 \times 10^{-6} \times {}^\circ C^{-1}$.

A chromium-containing steel which is particularly suitable for the passive component of the thermoelectric bimetal according to the invention is composed by weight of:

| | |
|---|---|
| less than 0.5% | carbon |
| less than 1% | manganese, |
| less than 1.5% | silicon, |
| less than 2% | aluminum, |
| 12% to 25% | chromium, |
| up to 3.5% | titanium, |
| up to 6.0% | niobium and/or tantalum, |
| up to 2% | molybdenum and/or tungsten, |
| up to 1% | vanadium, and the |
| balance | iron with impurities which are due to the melting conditions. |

A steel which is particularly suitable for the passive component is composed by weight of

| | |
|---|---|
| less than 0.10% | carbon, |
| less than 1.0% | silicon, |
| less than 1.0% | manganese, |
| 15.5% to 17.5% | chromium, and |
| balance | iron with impurities which are due to the melting conditions. |

These steels have a coefficient of expansion of $11 \times 10^{-6} {}^\circ C^{-1}$ to $12 \times 10^{-6} \times {}^\circ C^{-1}$.

The passive component of the thermometric bimetal according to the invention may alternatively consist of titanium, specifically of pure titanium which contains 99% titanium, the balance consisting of impurities which are due to the manufacture, or may consist of titanium alloys. Suitable titanium alloys A or B are composed by weight of:

A

5% to 7% aluminum,

3% to 5% vanadium, and balance titanium with impurities which are due to manufacture.

B

4% to 6% aluminum,

2% to 3% tin, and balance titanium with impurities which are due to manufacture.

Such a passive component has a coefficient of expansion of about $10 \times 10^{-6} \times {}^\circ C^{-1}$.

Finally, the passive component may be made of molybdenum or molybdenum alloys. Molybdenum alloys should contain at least 98% molybdenum. The alloying elements may consist, e.g., of titanium, zirconium, hafnium, carbon, and nitrogen. A suitable molybdenum alloy contains 0.2% titanium and 0.5% zirconium. Such passive components have a coefficient of expansion of about $4 \times 10^{-6} {}^\circ C^{-1}$ to $6 \times 10^{-6} \times {}^\circ C^{-1}$.

Whereas the alloys of the active component of the thermometric bimetal according to the invention have a coefficient of expansion of $19 \times 10^{-6} {}^\circ C^{-1}$ to $22 \times 10^{-6} \times {}^\circ C^{-1}$ up to 700° C, the passive components have a coefficient of expansion of about $4 \times 10^{-6} {}^\circ C^{-1}$ to $12 \times 10^{-6} \times {}^\circ C^{-1}$.

Such alloys are known per se but have not been used so far as passive components of thermometic bimetallic structure apparently because their coefficient of expansion of 4 to $12 \times 10^{-6} \times {}^\circ C^{-1}$ is too high unless an alloy which has a sufficiently high coefficient of expansion is available for the active component.

The combination of materials according to the invention provides a thermometric bimetal which has a sufficiently high strength at high temperatures for the use of the bimetal at temperatures above 500° C and up to at least 700° C.

In view of the atmosphere which is present at high temperature, it may sometimes be suitable to provide the active component, on its surface or elsewhere, with a coating which increases resistance to scaling. Such coating may be made by burnishing, metallizing, e.g., nickel-coating or chromium-coating, or by an application of metal or ceramic oxide layers, e.g., by chemical vapor deposition.

If the thermometric bimetal according to the invention is to have an excursion in response to being directly heated, e.g., by electrical resistance heating, an electrically conductive interlayer which consists, e.g., of nickel or copper and has a suitably small thickness is provided between the two layers consisting of the active and passive metal components. The interlayer may also be an alloy.

The individual components of the thermometric bimetal may be joined in known manner by a roll cladding process at room temperature or at elevated temperature or by an explosive cladding process. Alternatively, we can use the processes which result in seam or spot welds and in which only fractions of the surfaces to be welded and very small thicknesses of material are subjected to structure-changing welding temperatures. For this reason, suitable processes include electrical resistance welding and, particularly, laser welding, microplasma welding or electron beam welding.

A special advantage of the thermometric bimetal according to the invention resides in that the active component may be cold formed so that cold forming will appreciably increase the coefficient of expansion whereas the coefficient of expansion of the passive component is less increased by such cold forming. In this manner, the temperature-dependent excursion of the novel thermometric bimetal according to the invention may be increased further.

The cold forming operation for work hardening the bimetallic strip, sheet or bar preferably is carried out with 20 to 90% deformation, i.e. a reduction in the thickness of the bar, strip or sheet by cold rolling to 20 to 90% of its original value. Preferably the cold deformation is 30 to 60%.

BRIEF DESCRIPTION OF THE DRAWING

The sole FIGURE of the drawing is a graph illustrating the features of an example of a bimetallic structure according to the invention.

SPECIFIC DESCRIPTION AND EXAMPLE

The technical progress of the thermometric bimetal according to the invention is seen in that a shaped part which consists of thermometric bimetal and has a high strength at high temperature is provided which can be used continuously at temperatures which are higher by about 100° to 200° C than the highest temperatures at which the previously known corresponding high-temperature bimetals can be employed. The temperaturedependent excursion is fully reversible up to at least 700° C and exhibits only a small deviation from linearity.

In the drawing, the temperature is given on ° C along the abscissa while the ordinate represents the coefficient of excursion (excursion per ° C) of the bimetallic structure upon being heated from a temperature of 20° C to the indicated temperature of the abscissa of the curve.

The lower plot S represents the laminate prior to work hardening while the upper plot H represents the cold rolled product which is worked until its thickness has been reduced by 50% (cold rolled to 50% deformation).

The bimetallic structure which was tested comprised an active component which consisted of 0.69% carbon, 0.08% silicon, 5.35% manganese, 2.87% chromium, 12.59% nickel, 1.14% vanadium, 0.05% nitrogen, 0.26% niobium and tantalum combined in equal parts, 0.02% molybdenum, balance iron (percentages and parts by weight).

The passive component consisted of 0.08% carbon, 0.74% silicon, 0.34% manganese, 17.1% chromium, balance iron (all percentages and parts by weight). The foregoing compositions represent the composition of the active and passive elements constituting the best mode currently known to us for carrying out the invention in practice.

The thermometric bimetal according to the invention is used in appliances for industrial and nonindustrial purposes, particularly in automatic control systems for industrial or household furnaces, in electric heating systems of any kind, and in automatic control systems for motors, particularly in conjunction with means for an afterburning of exhaust gases from engines of motor vehicles.

We claim:

1. A thermometric bimetallic structure having high strength at elevated temperature and comprising an active component and a passive component secured together, said active component consisting of an iron-nickel alloy having a coefficient of expansion of about $19 \times 10^{-6}\,°\,C^{-1}$ to $22 \times 10^{-6} \times °\,C^{-1}$ and composed by weight of

| | |
|---|---|
| 0.4% to 0.9% | carbon, |
| 0.03% to 0.10% | nitrogen, |
| 10.0% to 14.0% | nickel, |
| 3.0% to 7.0% | manganese, |
| 0.2% to 1.0% | niobium and/or tantalum, |
| 0.5% to 1.5% | vanadium, |
| up to 1.5% | molybdenum, |
| up to 1.5% | tungsten, |
| up to 3.5% | chromium, |

-continued

| | |
|---|---|
| up to 0.5% | silicon, and |
| balance | iron with impurities which are due to the melting conditions, |

the total of vanadium, molybdenum and tungsten being at most 2%; the passive component being metallic and having a coefficient of expansion of about $3 \times 10^{-6}\,°\,C^{-1}$ to $12 \times 10^{-6} \times °\,C^{-1}$.

2. The thermometric bimetallic defined in claim 1, wherein the active component is composed by weight of

| | |
|---|---|
| 0.60% to 0.75% | carbon, |
| 0.05% to 0.08% | nitrogen, |
| 11.5% to0 12.5% | nickel, |
| 4.5% to 5.5% | manganese, |
| 0.2% to 0.5% | tungsten and/or tantalum, |
| 0.9% to 1.2% | vanadium, |
| 2.5% to 3.5% | chromium, |
| less than 0.3% | silicon, |
| less than 0.02% | phosphorus, |
| less than 0.02% | sulfur, and |
| balance | iron. |

3. The thermometric bimetallic structure defined in claim 1 wherein the passive component has a coefficient of expansion of about $5 \times 10^{-6} \times °\,C^{-1}$ and is composed by weight of

| | |
|---|---|
| less than 0.5% | manganese, |
| less than 0.03% | carbon, |
| less than 0.2% | silicon, |
| 16 to 20% | cobalt, |
| 27 to 31% | nickel, |
| up to 0.5% | molybdenum, and the |
| balance | iron with impurities which are due to the melting conditions. |

4. The thermometric bimetallic structure defined in claim 3 wherein the molybdenum is present in said passive component in an amount ranging between 0.1% by weight to 0.5% by weight.

5. The thermometric bimetallic structure defined in claim 3 wherein said cobalt is present in an amount of about 18% by weight in said passive component.

6. The thermometric bimetallic structure defined in claim 3 wherein said nickel is present in an amount of 29% by weight of said passive component.

7. A thermometric bimetallic structure as defined in claim 1 wherein the passive component has a coefficient of expansion of $11 \times 10^{-6}\,°\,C^{-1}$ to $12 \times 10^{-6} \times °\,C^{-1}$ and is composed by weight of

| | |
|---|---|
| less than 0.5% | carbon, |
| less than 1% | manganese, |
| less than 1.5% | silicon, |
| less than 2% | aluminum |
| 12% to 25% | chromium, |
| up to 3.5% | titanium |
| up to 6.0% | niobium and/or tantalum, |
| up to 2% | molybdenum and/or tungsten, |
| up to 1% | vanadium, and the |
| balance | iron with impurities which are due to the melting conditions. |

8. A thermometric bimetallic structure as defined in claim 1 wherein the passive component is composed by weight of

| | |
|---|---|
| less than 0.10% | carbon, |
| less than 1.0% | silicon, |
| less than 1.0% | manganese, |
| 15.5% to 17.5% | chromium, and the |
| balance | iron with impurities which are due to the melting conditions. |

9. A thermometric bimetallic structure as defined in claim 1 wherein the passive component consists of titanium or of a titanium alloy having a coefficient of expansion of about $10 \times 10^{-6} \times {}^\circ C^{-1}$.

10. The thermometric bimetallic structure defined in claim 1 wherein the passive component consists of molybdenum or a molybdenum alloy which contains at least 98% molybdenum and has a coefficient of expansion of $4 \times 10^{-6} \times {}^\circ C^{-1}$ to $6 \times 10^{-6} \times {}^\circ C^{-1}$.

11. The thermometric bimetallic structure defined in claim 1 wherein an electrically conductive interlayer consisting of nickel or copper or of an alloy of both metals is interposed between said components.

12. The thermometric bimetallic structure defined in claim 1 wherein the surface of at least the active metal component has a scale-resisting metallic or non-metallic coating.

13. The thermometric bimetallic structure defined in claim 1 which has been cold formed to a deformation of 20–90%.

14. The thermometric bimetallic structure defined in claim 13 wherein said deformation is 30 to 60%.

* * * * *

UNITED STATES PATENT AND TRADEMARK OFFICE

CERTIFICATE OF CORRECTION

PATENT NO. : 4,013,425

DATED : 22 March 1977

INVENTOR(S) : Horst MÜHLBERGER and Manfred RÜHLE

It is certified that error appears in the above-identified patent and that said Letters Patent are hereby corrected as shown below:

Claim 2, (column 6, line 19), for "0.2% to 0.5% tungsten and/or tantalum," read:

-- 0.2% to 0.5% niobium and/or tantalum, -- .

Signed and Sealed this twenty-sixth Day of July 1977

[SEAL]

Attest:

RUTH C. MASON
*Attesting Officer*

C. MARSHALL DANN
*Commissioner of Patents and Trademarks*